United States Patent
Paton et al.

(10) Patent No.: US 7,938,473 B2
(45) Date of Patent: May 10, 2011

(54) ELECTROMECHANICAL STRUT

(75) Inventors: Gordon Andrew Paton, Sharon (CA); Stephen A. G. Mitchell, Windsor (CA); Dragan Mrkovic, Newmarket (CA); Krzysztof Groszkowski, Newmarket (CA); Borys M. Shchokin, Thornhill (CA); Victor Gusev, Richmond Hill (CA)

(73) Assignee: Magna Closures Inc., Newmarket (CA)

( * ) Notice: Subject to any disclaimer, the term of this patent is extended or adjusted under 35 U.S.C. 154(b) by 0 days.

(21) Appl. No.: 12/404,646

(22) Filed: Mar. 16, 2009

(65) Prior Publication Data

US 2009/0200830 A1 Aug. 13, 2009

Related U.S. Application Data

(63) Continuation-in-part of application No. 11/678,631, filed on Feb. 26, 2007, now Pat. No. 7,566,092, and a continuation-in-part of application No. 11/199,470, filed on Aug. 8, 2005, now Pat. No. 7,234,757.

(60) Provisional application No. 60/777,079, filed on Feb. 27, 2006, provisional application No. 60/599,742, filed on Aug. 6, 2004.

(51) Int. Cl.
*B60J 5/10* (2006.01)
*E05F 15/02* (2006.01)

(52) U.S. Cl. ......... 296/146.8; 74/89.34; 49/340; 49/341

(58) Field of Classification Search ........... 74/25, 89.34; 296/146.8, 56, 106; 49/324–363
See application file for complete search history.

(56) References Cited

U.S. PATENT DOCUMENTS

| 2,371,336 | A |   | 3/1945 | Levon |
|---|---|---|---|---|
| 2,387,800 | A | * | 10/1945 | Leland et al. ............ 318/14 |
| 2,738,972 | A |   | 3/1956 | Morris |
| 3,552,145 | A | * | 1/1971 | Barton et al. ............ 464/73 |
| 4,821,456 | A |   | 4/1989 | Nogaki |
| 5,187,993 | A |   | 2/1993 | Nicholson et al. |
| 5,295,407 | A |   | 3/1994 | Hirose et al. |
| 5,367,826 | A |   | 11/1994 | Wu |
| 5,944,376 | A |   | 8/1999 | Buchanan |
| 6,185,868 | B1 |   | 2/2001 | Kato |
| 6,516,567 | B1 |   | 2/2003 | Stone et al. |
| 6,755,458 | B1 |   | 6/2004 | Oberheide |

(Continued)

FOREIGN PATENT DOCUMENTS

DE 29605182 U1 6/1996

(Continued)

*Primary Examiner* — Dennis H Pedder
(74) *Attorney, Agent, or Firm* — Clark Hill P.L.C.

(57) ABSTRACT

An electromechanical strut is provided for moving a pivotal lift gate between an open position and a closed position relative to a motor vehicle body. The electromechanical strut includes a housing connected to one of the lift gate and the motor vehicle body. An extensible shaft is slidably mounted to the housing. The extensible shaft is connected to the other of the lift gate and the motor vehicle body. A drive mechanism includes a rotatable power screw. The drive mechanism converts rotary motion of the power screw into linear motion of the extensible shaft to move the extensible shaft between a retracted position corresponding to the closed position of the lift gate and an extended position corresponding to the open position of the lift gate. A power spring includes one end connected to the extensible shaft and another end connected to the housing for providing a mechanical counterbalance to the weight of the lift gate.

10 Claims, 14 Drawing Sheets

U.S. PATENT DOCUMENTS

| | | | |
|---|---|---|---|
| 6,814,392 B1 | 11/2004 | Tomaszewski | |
| 6,837,461 B1 | 1/2005 | Shiao | |
| 7,021,001 B1 | 4/2006 | Schooler | |
| 7,234,757 B2 | 6/2007 | Mitchell | |
| 7,416,237 B1 | 8/2008 | Kachouch et al. | |
| 7,681,469 B2 * | 3/2010 | Ritter ........................ | 74/89.23 |
| 2003/0085589 A1 | 5/2003 | Oberheide et al. | |
| 2006/0043763 A1 | 3/2006 | Berklich, Jr. et al. | |
| 2006/0082188 A1 | 4/2006 | Mitchell | |
| 2007/0137331 A1 | 6/2007 | Kachouch | |
| 2007/0261310 A1 | 11/2007 | Porat et al. | |
| 2007/0262609 A1 | 11/2007 | King et al. | |
| 2007/0296244 A1 | 12/2007 | Borrmann | |

FOREIGN PATENT DOCUMENTS

| | | |
|---|---|---|
| DE | 10001054 A1 | 6/2001 |
| DE | 10118303 C1 | 5/2002 |
| DE | 102004040170 A1 | 3/2006 |
| FR | 2814771 A1 | 5/2002 |

* cited by examiner

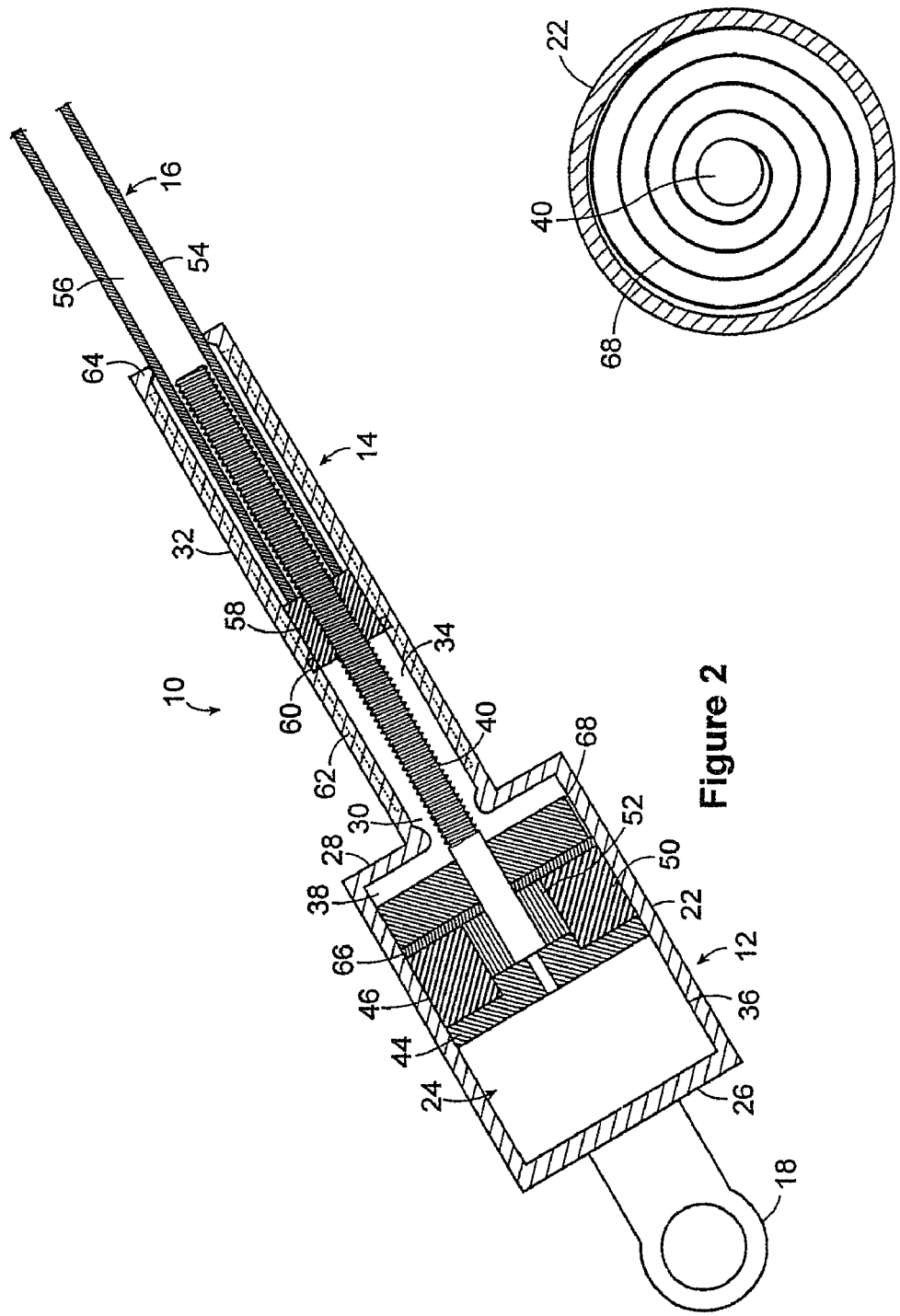

ELECTROMECHANICAL STRUT

CROSS-REFERENCE TO RELATED APPLICATIONS

This application is a continuation-in-part of U.S. application Ser. No. 11/678,631 filed Feb. 26, 2007, now U.S. Pat. No. 7,566,092, which claimed the benefit of U.S. Provisional Application Ser. No. 60/777,079, filed Feb. 27, 2006. The '631 application, in turn, is a continuation-in-part of U.S. application Ser. No. 11/199,470, filed Aug. 8, 2005, now U.S. Pat. No. 7,234,757, which claimed the benefit of U.S. Provisional Application Ser. No. 60/599,742, filed Aug. 6, 2004.

BACKGROUND OF THE INVENTION

1. Field of the Invention

The invention relates to an electrically-driven mechanical strut. More particularly, the present invention relates to an electromechanical strut used to raise or lower an automotive lift gate.

2. Description of Related Art

Lift gates provide a convenient access to the cargo areas of hatchbacks, wagons, and other utility vehicles. Typically, the lift gate is hand operated, requiring manual effort to move the lift gate between the open and the closed positions. Depending on the size and weight of the lift gate, this effort can be difficult for some users. Additionally, manually opening or closing a lift gate can be inconvenient, particularly when the user's hands are full.

Attempts have been made to reduce the effort and inconvenience of opening or closing a lift gate. One solution is to pivotally mount gas struts to both the vehicle body and the lift gate, reducing the force required for opening the lift gate. However, the gas struts also hinder efforts to close the lift gate, as the struts re-pressurize upon closing, increasing the effort required. Additionally, the efficacy of the gas struts vary according to the ambient temperature. Furthermore, the use of gas struts still requires that the lift gate is manually opened and closed.

U.S. Pat. No. 6,516,567 to Stone et al. (hereafter referred to as the '567 patent) provides a power actuator that works in tandem with a gas strut. The '567 power actuator comprises a motor mounted within the vehicle body coupled to a flexible rotary cable by a clutch. The flexible rotary cable drives an extensible strut that is pivotally mounted to both the vehicle body and the lift gate. Thus, the motor can raise or lower the lift gate conveniently without manual effort. A controller to engage and disengage the motor can be connected to a remote key fob button or a button in the passenger compartment, providing additional convenience.

The power actuator described in the '567 patent is not without its disadvantages. The power actuator is comprised of multiple parts, each of which needs to be assembled and mounted to the vehicle separately, increasing costs. The vehicle body must be specifically designed to provide a space to house the motor. Due to the limited space available, the motor is small and requires the assistance of the gas strut. Additionally, because the power actuator described in the '567 patent is designed to work in tandem with a gas strut, the gas strut can still vary in efficacy due to temperature. Thus, the motor provided must be balanced to provide the correct amount of power with varying degrees of mechanical assistance from the gas strut.

It is therefore desired to provide a means for raising and lowering a vehicle lift gate that obviates or mitigates at least one of the above-identified disadvantages of the prior art.

SUMMARY OF THE INVENTION

According to an embodiment of the invention, an electromechanical strut is provided for moving a pivotal lift gate in a motor vehicle body between a closed and an open position. The electromechanical strut comprises a housing, pivotally mountable to one of the motor vehicle body and the lift gate; an extensible shaft, one end of the shaft being slidably mounted to the housing, and the other end of the shaft being pivotally mounted to the other of the motor vehicle body and the lift gate; a drive mechanism, comprising a power screw, for converting rotary motion into linear motion of the extensible shaft in order to move it between a position corresponding to the closed position of the lift gate and an extended position corresponding to the open position of the lift gate; and a power spring, connected to the power screw within the housing, which assists the power screw.

The present invention provides an electromechanical strut using an inline motor coupled to an inline planetary gear that are both mounted in the housing. The motor-gear assembly drives a power screw and nut assembly in the upper housing, extending or retracting an extensible shaft. Additionally, a power spring mounted coaxially around the power screw urges the extensible shaft to the extended position and provides a mechanical counterbalance to the weight of a lift gate on the shaft. As the shaft extends, the power spring uncoils, assisting the motor-gear assembly in raising the lift gate. Retracting the shaft recoils the spring, storing potential energy. Thus, a lower torque motor-gear assembly can be used, reducing the diameter of the housing.

In another embodiment of the invention, an electromechanical strut is provided for moving a pivotal lift gate between an open position and a closed position relative to a motor vehicle body. The electromechanical strut includes a housing connected to one of the lift gate and the motor vehicle body. An extensible shaft is slidably mounted to the housing. The extensible shaft is connected to the other of the lift gate and the motor vehicle body. A drive mechanism includes a rotatable power screw. The drive mechanism converts rotary motion of the power screw into linear motion of the extensible shaft to move the extensible shaft between a retracted position corresponding to the closed position of the lift gate and an extended position corresponding to the open position of the lift gate. A power spring includes one end connected to the extensible shaft and another end connected to the housing for providing a mechanical counterbalance to the weight of the lift gate.

BRIEF DESCRIPTION OF THE DRAWINGS

The invention will now be described, by way of example only, with reference to the attached Figures, wherein:

FIG. 2 is a cross-sectional view in side profile of one of the electromechanical struts shown in FIG. 1, shown in an extended position;

FIG. 3 is a cross-sectional view in top profile of a spring housing on the electromechanical strut shown in FIG. 2;

DETAILED DESCRIPTION OF THE EMBODIMENTS

Figure 1:
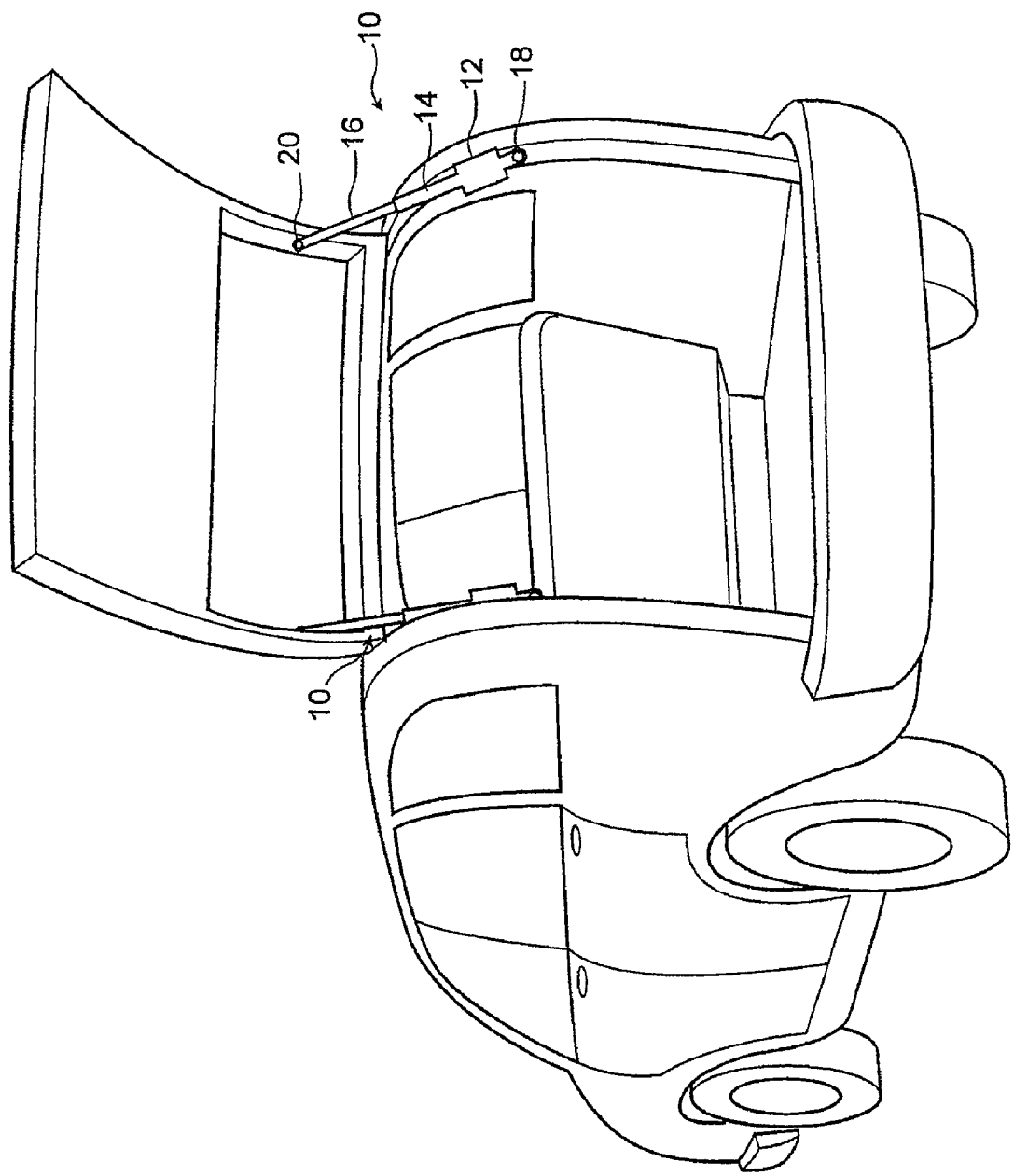
FIG. 1 is a perspective view of a motor vehicle having a lift gate controlled by a pair of electromechanical struts in accordance with one embodiment of the invention.

Referring now to FIGS. 1 and 2, an embodiment of the invention mounted to a motor vehicle is shown generally at 10. Electromechanical strut 10 includes a lower housing 12, an upper housing 14, and an extensible shaft 16. A pivot mount 18, located at an end of lower housing 12 is pivotally mounted to a portion of the vehicle body that defines an interior cargo area in the vehicle. A second pivot mount 20 is attached to the distal end of extensible shaft 16, relative to upper housing 14, and is pivotally mounted to the lift gate of the vehicle.

Referring now to FIG. 2, the interior of lower housing 12 is shown in greater detail. Lower housing 12 provides a cylindrical sidewall 22 defining a chamber 24. Pivot mount 18 is attached to an end wall 26 of lower housing 12 proximal to the vehicle body (not shown). Upper housing 14 provides a cylindrical sidewall 32 defining a chamber 34 that is open at both ends. A distal end wall 28 of lower housing 12 includes an aperture 30 so that chamber 24 and chamber 34 communicate with each other. Upper housing 14 has a smaller diameter than lower housing 12. However, it is contemplated that lower housing 12 and upper housing 14 can also be formed as a single cylinder or frusto-cone. Other form factors for lower housing 12 and upper housing 14 will occur to those of skill in the art. Upper housing 14 can be integrally formed with lower housing 12, or it can be secured to lower housing 12 through conventional means (threaded couplings, weld joints, etc). A motor-gear assembly 36 is seated in chamber 24.

The motor-gear assembly 36 includes a motor 42, a clutch 44, a planetary gearbox 46, and a power screw 40. Motor 42 is mounted within chamber 24 near end wall 26. Motor 42 is secured to at least one of cylindrical sidewall 36 and end wall 26 to prevent undesired vibrations or rotation. Motor 42 is a direct current bi-directional motor. Electrical power and direction control for motor 42 is provided via electrical cables that connect into the vehicle body through apertures (not shown) in end wall 26. The clutch 44 is connected to an output shaft 48 on motor 42. Clutch 44 provides a selective engagement between the output shaft 48 of motor 42 and the planetary gearbox 46. Clutch 44 is an electromechanical tooth clutch that engages planetary gearbox 46 when motor 42 is activated. When clutch 44 is engaged, torque is transferred from motor 42 through to planetary gearbox 46. When clutch 44 is disengaged, torque is not transferred between motor 42 and planetary gearbox 46 so that no back drive occurs if the lift gate is closed manually.

Planetary gearbox 46 is a two-stage planetary gear that provides torque multiplication for power screw 40. A ring gear 50 is driven by the teeth of clutch 44. In turn, a number of planetary gears 52 transfer power from ring gear 50 to power screw 40, which is centrally journaled within planetary gearbox 46, providing the desired gear ratio reduction to power screw 40. In the present embodiment, planetary gearbox 46 provides a 47:1 gear ratio reduction. Other gear ratio reductions will occur to those of skill in the art. Power screw 40 extends into upper housing 14.

Extensible shaft 16 provides a cylindrical sidewall 54 defining a chamber 56 and is concentrically mounted between upper housing 14 and power screw 40. As described earlier, pivot mount 20 is attached to the distal end of extensible shaft 16. The proximal end of extensible shaft 16 is open. A drive nut 58 is mounted around the proximal end of extensible shaft 16 relative to lower housing 12 and is coupled with power screw 40 in order to convert the rotational movement of power screw 40 into the linear motion of the extensible shaft 16 along the axis of power screw 40. Drive nut 58 includes two splines 60 that extend into opposing coaxial slots 62 provided on the inside of upper housing 14 to prevent drive nut 58 from rotating. The length of slots 62 defines the retracted and the extended positions of extensible shaft 16. Alternatively, a ball screw assembly could be used in lieu of drive nut 58 without departing from the scope of the invention. An integrally-formed outer lip 64 in upper housing 14 provides an environmental seal between chamber 34 and the outside.

A spring housing 38 is provided in lower housing 12 and is defined by cylindrical sidewall 22, end wall 28, and a flange 66. Within spring housing 38, a power spring 68 is coiled around power screw 40, providing a mechanical counterbalance to the weight of the lift gate. Preferably formed from a strip of steel, power spring 68 assists in raising the lift gate both in its powered and un-powered modes. One end of power spring 68 attaches to power screw 40 and the other is secured to a portion of cylindrical sidewall 22. When extensible shaft 16 is in its retracted position, power spring 68 is tightly coiled around power screw 40. As power screw 40 rotates to extend extensible shaft 16, power spring 68 uncoils, releasing its stored energy and transmitting an axial force through extensible shaft 16 to help raise the lift gate. When power screw 40 rotates to retract extensible shaft 16, power spring 68 recharges by recoiling around power screw 40.

Power spring 68 stores sufficient energy when coiled to drive power screw 40 to fully raise the lift gate, even when motor gear assembly 36 is not engaged (typically by unlatching the lift gate to raise it manually.) In addition to assisting to drive power screw 40, power spring 68 provides a preloading force that reduces starting resistance and wear for motor 42. Furthermore, power spring 68 provides dampening assistance when the lift gate is closed. Unlike a gas strut, power spring 68 is generally not affected by temperature variations, nor does it unduly resist manual efforts to close the lift gate. Although the present embodiment describes power spring 68 that uncoils to assist in raising a lift gate and recoils to lower a lift gate, it has been contemplated that a power spring 68 could be provided that uncoils when lowering a lift gate and recoils when raising a lift gate.

Figure 4:
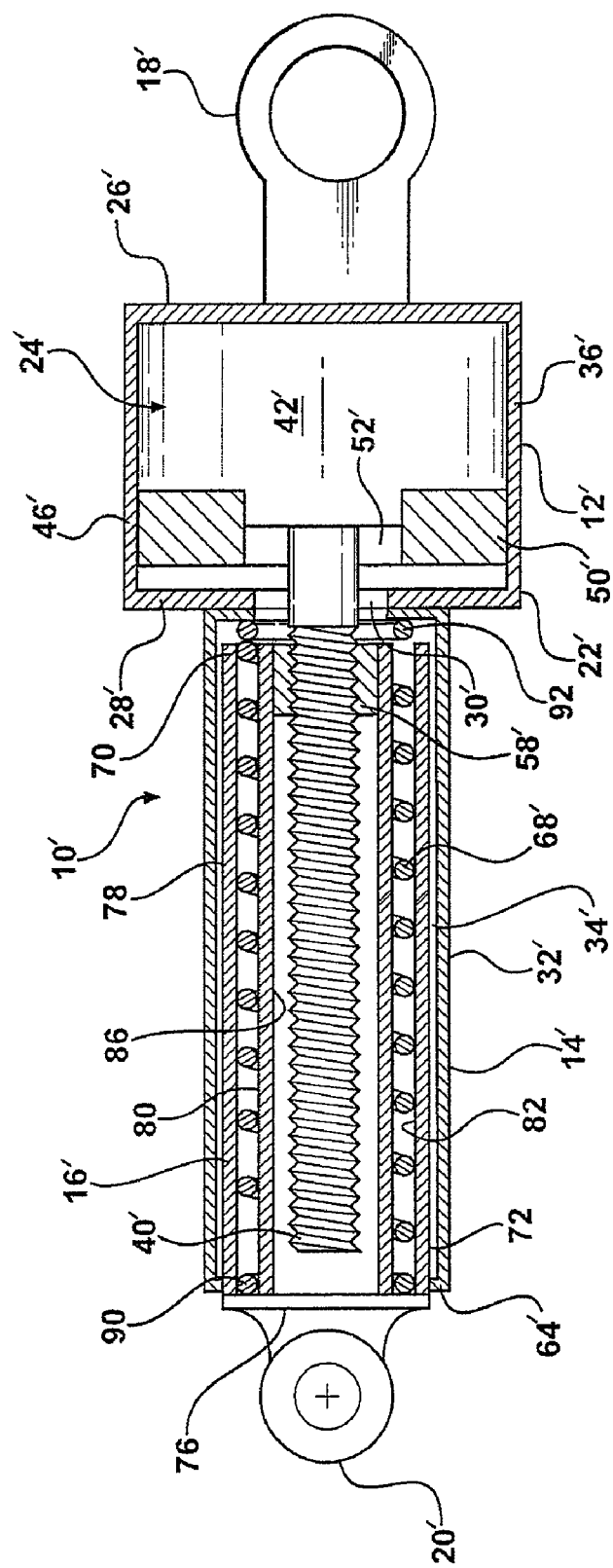
FIG. 4 is a cross-sectional view in side profile of an electromechanical strut according to a second embodiment in a retracted position.
Figure 5:
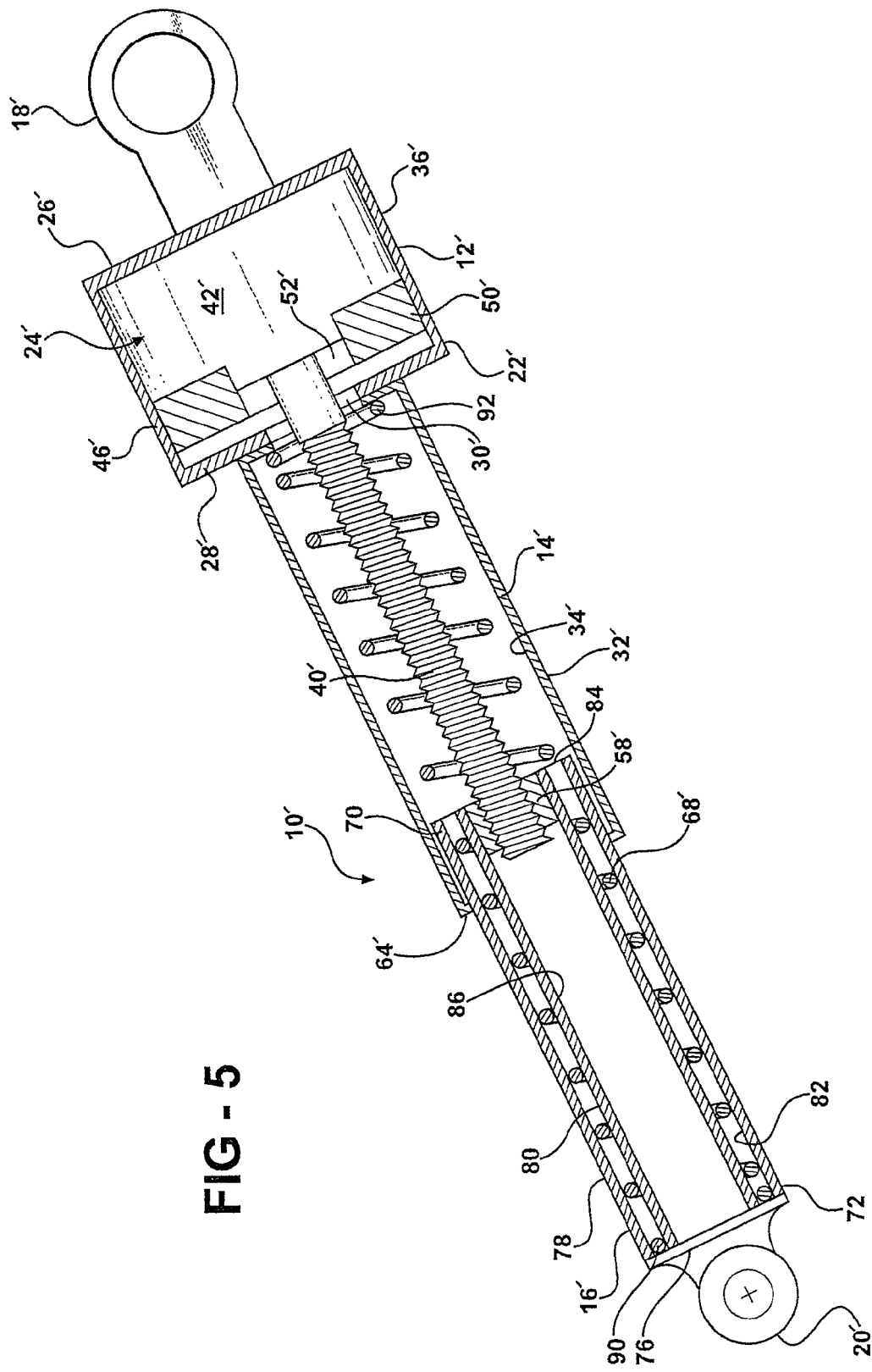
FIG. 5 is a cross-sectional view in side profile of the second embodiment in an extended position.

Referring to FIGS. 4 and 5, wherein primed reference numerals represent similar elements as those set forth above, the electromechanical strut 10' according to another embodiment includes the lower housing 12' having the cylindrical sidewall 22' defining the chamber 24', and the upper housing 14' having the cylindrical sidewall 32' defining the chamber 34'. It is appreciated that the lower 12' and upper 14' housings may be formed as a single housing.

The electromechanical strut 10' also includes the extensible shaft 16' movable between a retracted position, shown in FIG. 4, corresponding to a closed position of the lift gate and an extended position, shown in FIG. 5, corresponding to an open position of the lift gate.

The motor-gear assembly 36' is seated within the chamber 24'. The motor-gear assembly 36' includes the motor 42', the planetary gearbox 46', and the power screw 40'. The planetary gearbox 46' includes the planetary gears 52' that transfer power from the ring gear 50' to the power screw 40'. In the current embodiment, the planetary gearbox 46' provides a 20:1 gear ratio reduction.

The extensible shaft 16' extends between opposing first 70 and second 72 ends. The first end 70 of the extensible shaft 16' is open and the second end 72 of the extensible shaft 16' is closed off by an end wall 76. The second end 72 of the extensible shaft 16' is connected to the pivot mount 20'.

The extensible shaft 16' includes an outer cylindrical wall 78, and an inner cylindrical wall 80 spaced apart inwardly from the outer cylindrical wall 78. One end of the inner cylindrical wall 80 is connected to the end wall 76. The outer cylindrical wall 78 and the inner cylindrical wall 80 define a toroidal chamber 82 therebetween. One end of the toroidal chamber 82 is closed off by the end wall 76 and an opposing end of the toroidal chamber 82 defines an opening 84. The inner cylindrical wall 80 further defines a cylindrical chamber 86 inward of the toroidal chamber 82. The cylindrical chamber 86 is separated from the toroidal chamber 82 by the inner cylindrical wall 80.

The drive nut 58' is rigidly mounted in the cylindrical chamber 86 of the extensible shaft 16'. The drive nut 58' is coupled with the power screw 40' in order to convert the rotational movement of the power screw 40' into linear motion of the extensible shaft 16' along a longitudinal axis 88 of the power screw 40'.

The power spring 68' is seated within the toroidal chamber 82. The power spring 68' includes one end 88 connected to the second end 72 of the extensible shaft 16', and another end 90 connected to the upper housing 14' adjacent the lower housing 12'. The power spring 68' is a coil spring that uncoils and recoils as the extensible shaft 16' moves relative to the upper 14' and lower 12' housings. It is, however, appreciated that the particular type of spring may vary.

In powered operation, torque provided by the motor 42' is transferred via the planetary gearbox 46' to the screw 40', causing linear motion of the extensible shaft 16' as described above. For manual operation, the motor 42' and the planetary gearbox 46' must be back driven. The friction in the system due to the direct engagement of the motor 42' and the planetary gearbox 46' with the power screw 40' allows the lift gate to remain still in any intermediate position between the open and closed positions. The electromechanical strut 10' thus provides stable intermediate positions for the lift gate (useful, for example, for garages with low ceilings) without power consumption by using the internal friction of the motor-gear assembly 36'.

The power spring 68' provides a mechanical counterbalance to the weight of the lift gate. The power spring 68', which may be a coil spring, assists in raising the lift gate both in its powered and un-powered modes. When the extensible shaft 16 is in the retracted position, the power spring 68' is tightly compressed between the extensible shaft 16' and the lower housing 12'. As the power screw 40' rotates to extend the shaft 16', the power spring 68' extends as well, releasing its stored energy and transmitting an axial force through the shaft 16' to help raise the lift gate. When the power screw 40' rotates to retract the extensible shaft 16', or when the lift gate is manually closed, the power spring 68' is compressed between the shaft 16' and the lower housing 12' and thus recharges.

In addition to assisting in driving the power screw 40', the power spring 68' also provides a preloading force for reducing starting resistance and wear of the motor 42'. Furthermore, the power spring 68' provides dampening assistance when the lift gate is closed. Unlike a gas strut, the power spring 68' is generally not affected by temperature variations, nor does it unduly resist manual efforts to close the lift gate.

It is appreciated that a ball screw assembly, as known in the art, could be used in lieu of the drive nut 58'. Also, although reference has been made specifically to a lift gate, it is also appreciated that the invention may be applied to a variety of other closure panels such as trunks or deck lids.

Figure 6:
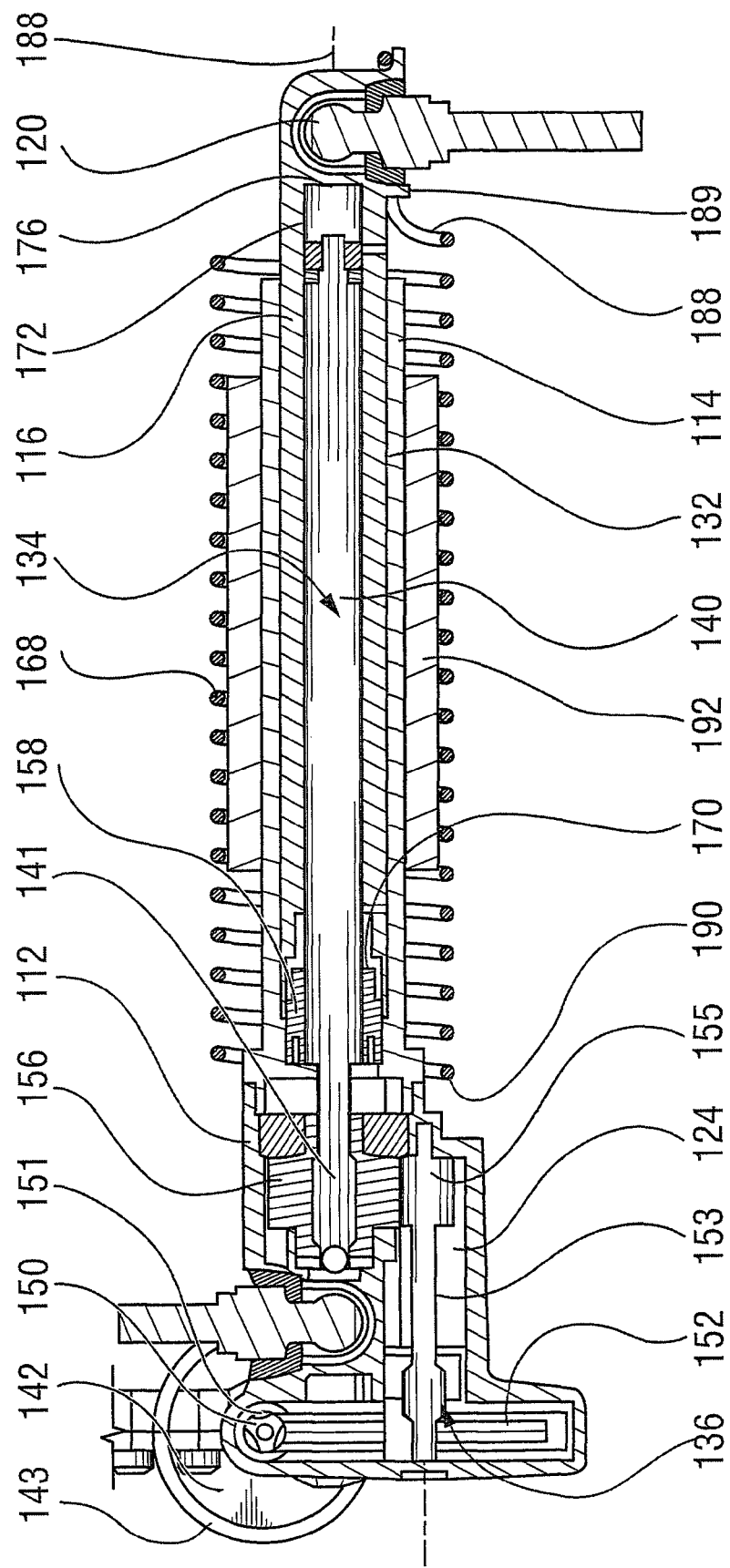
FIG. 6 is a cross-sectional view in side profile of an electromechanical strut according to a third embodiment in a retracted position.

FIG. 6 shows another embodiment of an electromechanical strut 100, which is particularly suited for smaller closure panels such as a trunk deck lid as opposed to larger closure panels such as lift gates, because electromechanical strut 100 has a shorter overall length as compared to the previously discussed embodiments.

Figure 7A:
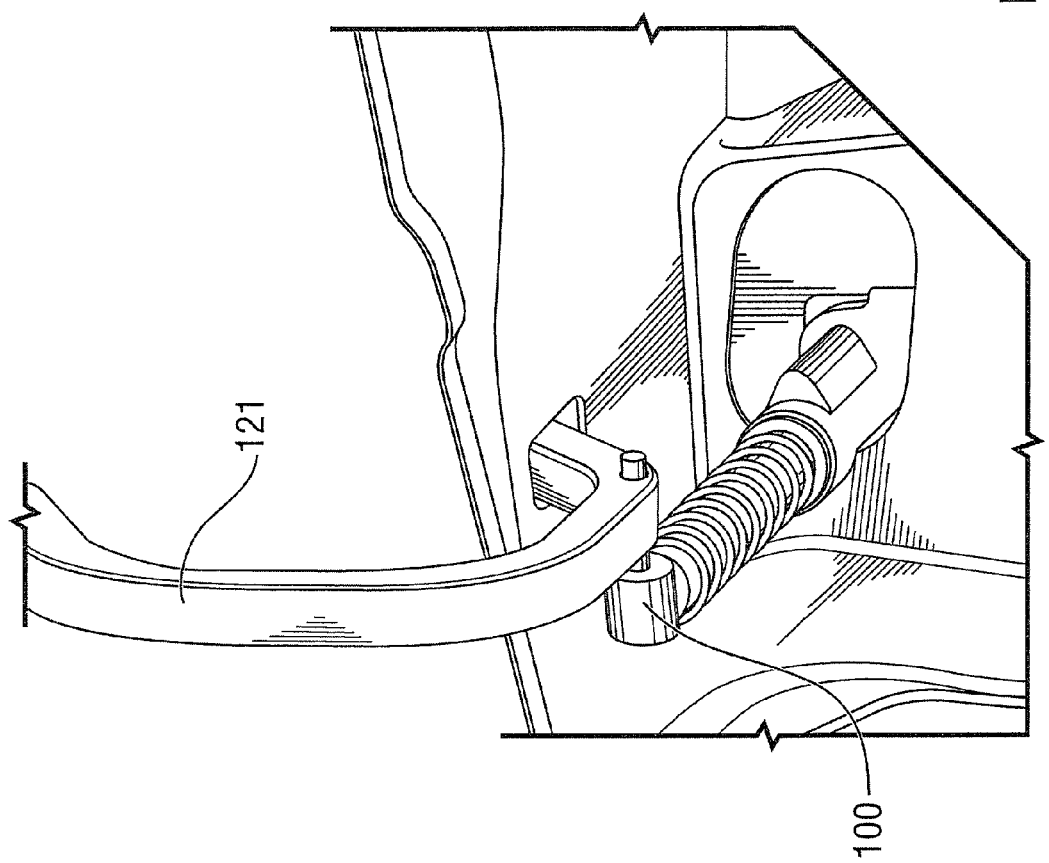
FIGS. 7A and 7B are perspective views of the third embodiment in different mounting positions for pivoting a vehicle trunk lid.

The electromechanical strut 100 includes a lower housing 112, providing a gearbox housing 124, and an upper housing 114, having a cylindrical sidewall 132 defining a chamber 134. The lower 112 and upper 114 housings may be formed as a single housing. The electromechanical strut 100 also includes an extensible shaft 116 movable between a retracted position, shown in FIG. 6, corresponding to a closed position of the deck lid, and an extended position, shown in FIG. 7A, corresponding to an open position of the deck lid.

A motor-gear assembly 135, including a motor 142, a two-stage gear train 136 and a power screw 140, drives the extensible shaft 116 as discussed in greater detail below. In this particular embodiment, the motor 142 is mounted in a housing 153 and coupled to the two-stage gear train 136. More particularly, the motor 142 features an output shaft 150 with a worm 151 fixedly mounted thereon that extends into the gearbox housing 124. The worm 151 drivingly engages a worm gear 152 mounted in the gearbox housing 124. The worm gear 152, in turn, includes an integral or rigidly mounted shaft 153 extending transversely from the worm gear 152 along its rotational axis 153, thus providing a first stage torque reduction. The shaft 153 is journalled in the gearbox housing 124 and features a pinion gear 155 that drivingly engages a drive gear 156, thus providing a second stage of torque reduction. In the present embodiment, the gear train 136 provides about a 38:1 gear ratio reduction, although this ratio will vary depending on the specific geometry of any particular application. The power screw 140 has a non threaded butt 141 that is fixedly connected to the drive gear 156, thus transferring power from the motor 142 to the power screw 140. In the foregoing manner, the motor 142 may be mounted with its longitudinal axis, which is centered along motor output shaft/worm 150, 152, transverse to a longitudinal axis 188 of the upper housing 114, which is centered along the power screw 140. Hence, the overall length of the electromechanical strut 100 may be reduced compared to the previously described embodiments 10, 10' of the strut.

The extensible shaft 116 extends between opposing first 170 and second 172 ends. The first end 170 of the extensible shaft 116 is open and the second end 172 of the extensible shaft 116 is closed off by an end wall 176. The second end 172 of the extensible shaft 116 is connected to a mount 120.

A drive nut 158 is rigidly mounted in the extensible shaft 116 at the first end 170 thereof. The drive nut 158 is drivingly coupled to the power screw 140 in order to convert the rotational movement of the power screw 140 into linear motion of the extensible shaft 116 along the longitudinal axis 188 of the power screw 40.

In the present embodiment, a power spring 168 is fitted over the cylindrical sidewall 132. One end 188 of the spring 168 abuts or is otherwise connected to a lip 189 proximate the second end 172 of the extensible shaft 116', and another end 190 of the spring 168 abuts or is otherwise connected to the upper housing 114 adjacent the lower housing 112. The spring 168 is a coil spring that uncoils and recoils as the extensible shaft 16' moves relative to the upper 114 and lower 112 housings. In the mounting position shown in FIG. 7A the spring 168 is in compression and is biased to urge the extensible shaft 116 toward the extended position corresponding to the open position of the deck lid. In this embodiment the mount 120 is connected to a goose neck hinge 121 that pivots the deck lid (not shown).

A foam dampener 192 is concentrically installed between the coils of the spring 168 and the cylindrical sidewall 132 to inhibit collapse of the coils and the minimize gear noise.

In powered operation, torque provided by the motor 142 is transferred via the gear train 136 to the power screw 140, causing linear motion of the extensible shaft 116 as described above. For manual operation, because there is no clutch, the motor 142 and the gear train 136 must be back driven.

The power spring 168 provides a mechanical counterbalance to the weight of the deck lid. The spring 168, which may be a coil spring, assists in raising the lift gate both in its powered and un-powered modes. When the extensible shaft 116 is in the retracted position, the power spring 168 is tightly compressed between the extensible shaft 116 and the lower housing 112. As the power screw 140 rotates to extend the shaft 116, the power spring 168 extends as well, releasing its stored energy and transmitting an axial force through the shaft 116 to help raise the lift gate. When the power screw 140 rotates to retract the extensible shaft 116, or when the lift gate is manually closed, the power spring 168 is compressed between the shaft 116 and the lower housing 112 and thus recharges.

Figure 7B:
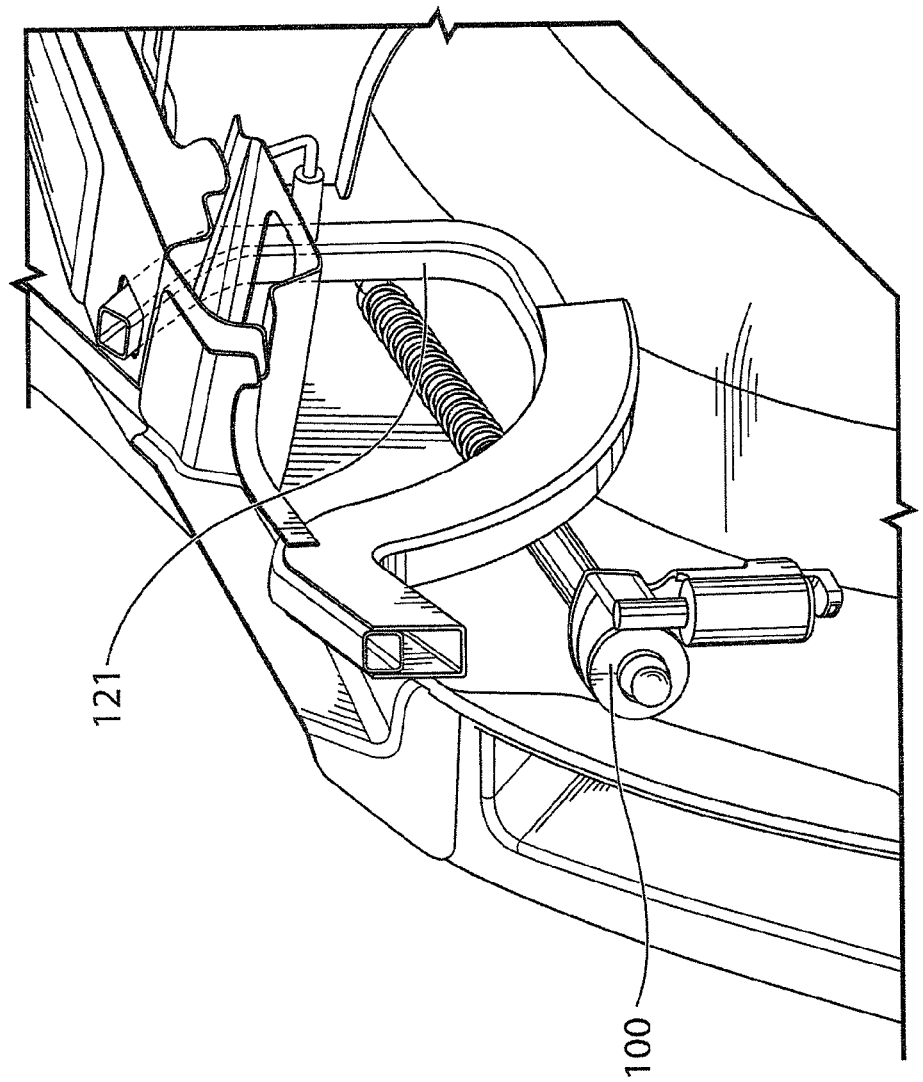

FIG. 7B the spring 168 is in compression and is biased to urge the extensible shaft 116 toward the extended position corresponding to the open position of the deck lid. In the mounting position shown in FIG. 7B, the extensible shaft 116 is in its fully extended position when the deck lid is closed and the extensible shaft 116 transitions to its fully retracted position when the deck lid is opened. In this mounting position the spring 168 is in tension and is biased to urge the extensible shaft 116 toward the retracted position corresponding to the open position of the deck lid 102.

Figures 8, 8I:
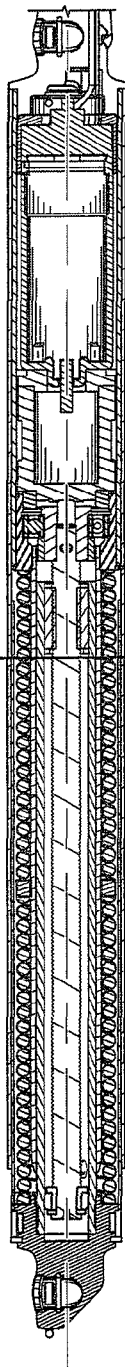
FIG. 8 is a cross-sectional view in side profile of an electromechanical strut according to a fourth embodiment in a retracted position.
Figure 8I:
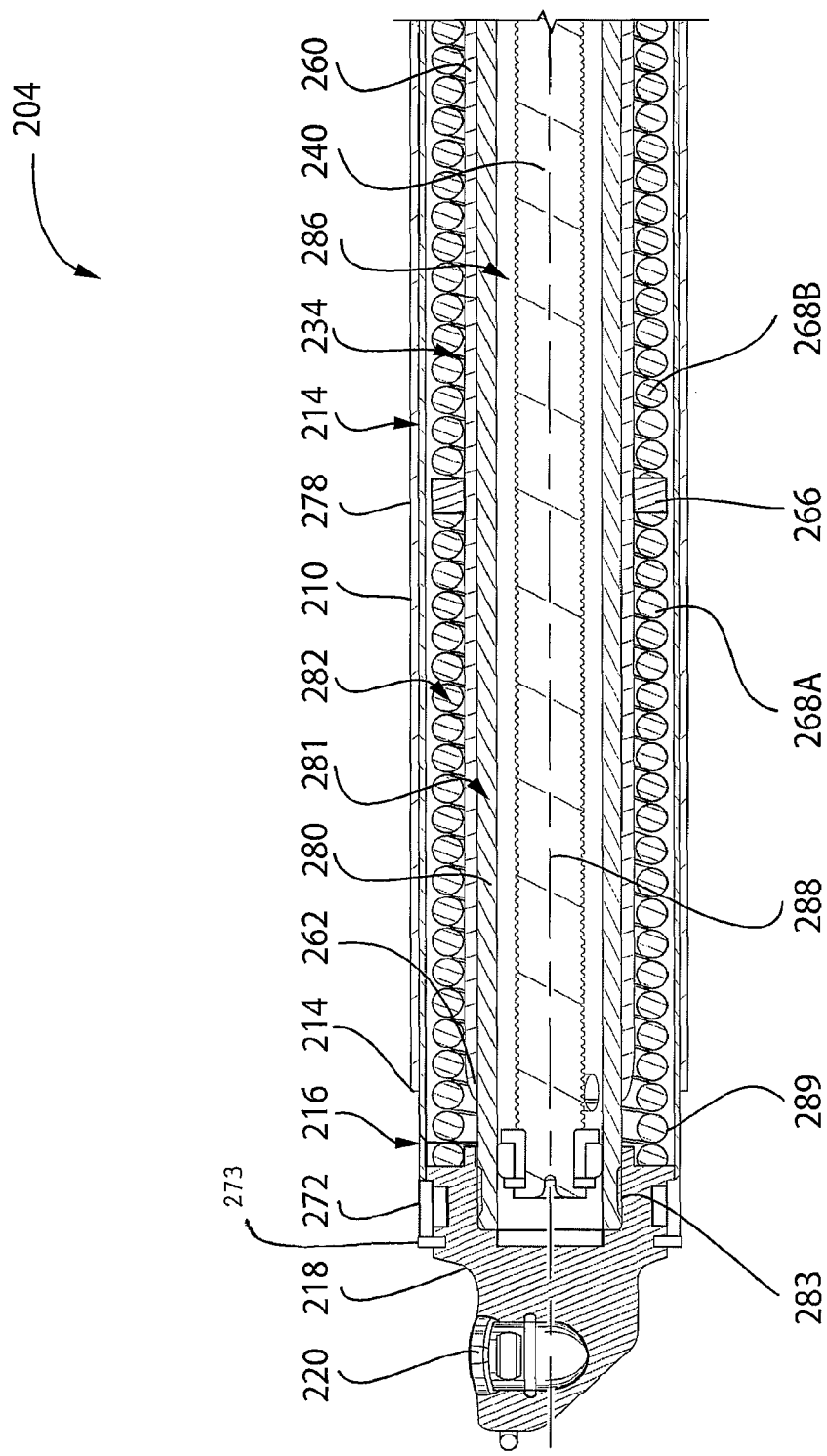
Figure 8I:
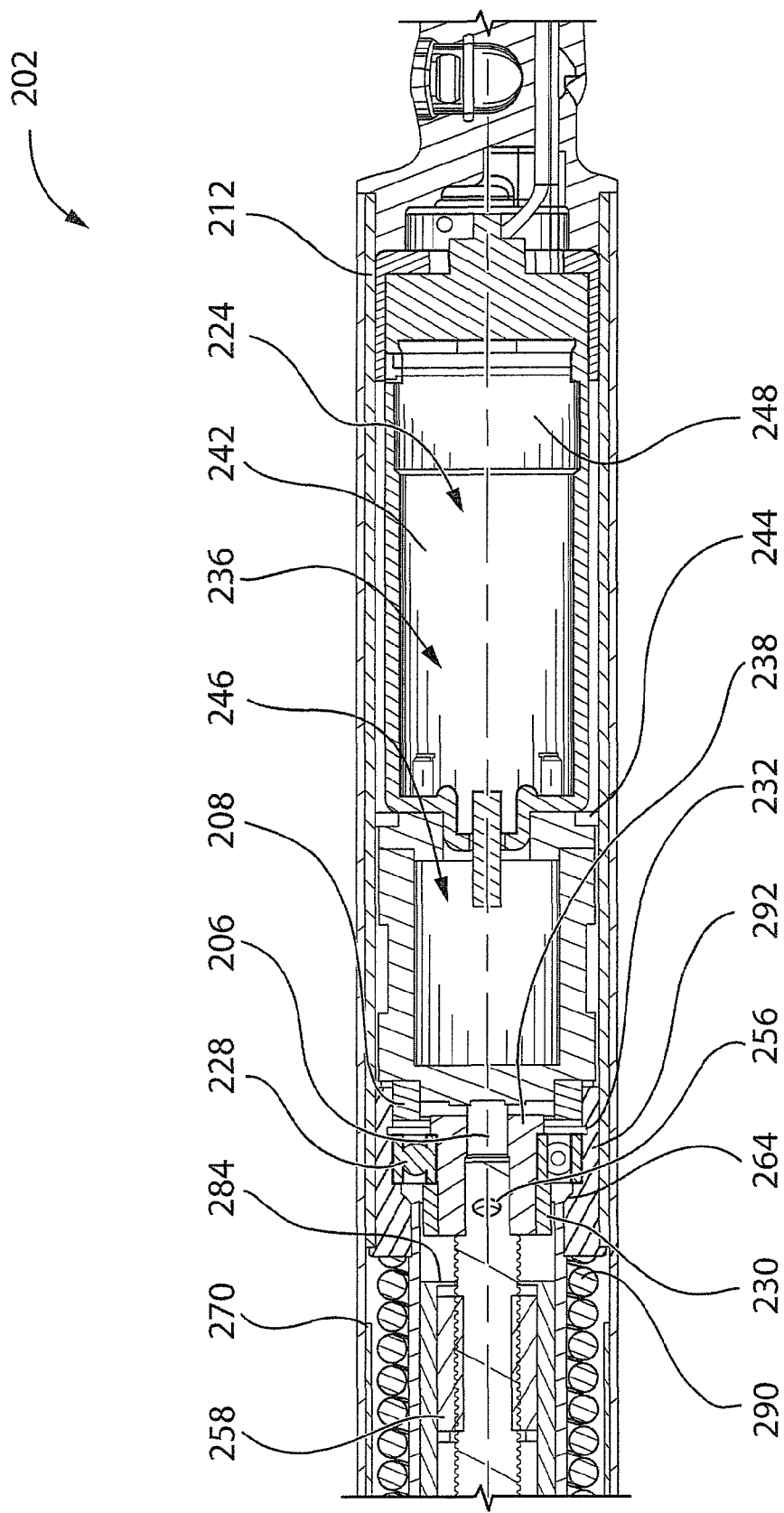
Figure 9:
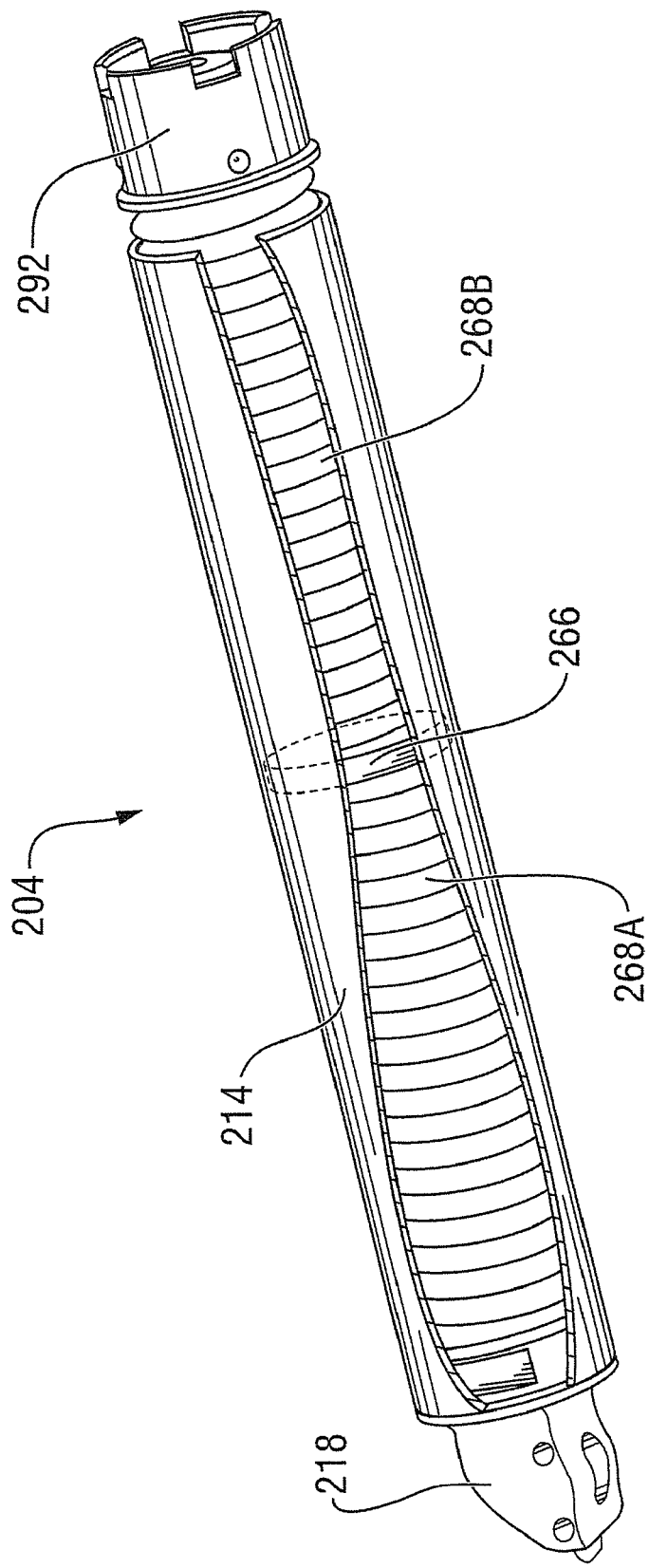
FIG. 9 is a fragmentary perspective view of a telescoping unit of the fourth embodiment, with an outer casing removed from view.

FIG. 8 shows a cross-sectional view of another embodiment of an electromechanical strut 200 that has a more modular design than the previously discussed embodiments 10, 10' of the strut. The electromechanical strut 200 comprises two main, separable, units: a power drive unit 202 and a telescoping unit 204, which are shown in isolation in the fragmentary axonometric views of FIG. 9 and FIG. 10 (with covering walls removed). The power drive unit 202 is sized and rated to function as a drive unit for a variety of closure panels associated with different vehicles. The telescoping unit 204 may be sized as required for each unique vehicle model to achieve a desired telescoping travel length. The power drive unit 202 features an output drive shaft 206 and an elastomeric coupling 208 that enable the power unit 202 to be quickly and easily attached with the telescoping unit 204 as discussed in greater detail below. As seen in FIG. 8, an elongate tubular cover 210 preferably manufactured from plastic is fitted over the power and telescoping units 202, 204 to cover the joint between the two units from the environment. The cover 210 also provides an aesthetically pleasing uniform appearance of the strut to the observer.

The power unit 202 has a tubular casing 212 defining a chamber 224. A portion of a motor-gear assembly 236 is seated within the chamber 224. The motor-gear assembly 236 includes a motor 242, a planetary gearbox 246 and a power screw 240. The motor 242 and the planetary gearbox 246 are seated within chamber 242. The power screw 240 is seated in the telescoping unit 204 and couples to the power unit output shaft 206, as discussed in greater detail below. In the illustrated embodiment, the planetary gearbox 246, which is known in the art per se, provides about a 20:1 gear ratio reduction.

The telescoping unit 204 has an extensible member 216 which comprises an outer guide tube or tubular casing 214 and a tubular nut-shaft 281, which are rigidly fixed to one another via an end cap 218. The extensible member 216 is movable between a retracted position, shown in FIG. 8, corresponding to a closed position of the lift gate, and an extended position, not shown, corresponding to an open position of the lift gate.

The outer tubular casing 214 includes a cylindrical wall 278 that extends between opposing first 270 and second 272 ends and defines a chamber 234. The first end 270 of the cylindrical wall 278 is open and the second end 272 of the cylindrical wall 278 is closed off by the end cap 218. Preferably, the second end 272 of the cylindrical wall 278 is secured to the end cap 218 via a snap ring 273. The end cap 218 includes a pivot mount 220.

The tubular nut-shaft 281 features a cylindrical wall 280 spaced apart inwardly from the cylindrical wall 278 of the outer tubular casing 214. One end of the cylindrical wall 280 is rigidly connected to the end cap 218. The cylindrical wall 278 of the outer tubular casing 214 and the cylindrical wall 280 of the tubular nut-shaft 281 define a toroidal chamber 282 therebetween. One end of the toroidal chamber 282 is closed off by the end cap 218 and an opposing end of the toroidal chamber 282 defines an opening 284. The cylindrical wall 280 of the tubular nut-shaft 281 further defines a cylindrical chamber 286 inward of the toroidal chamber 282. The cylindrical chamber 286 is separated from the toroidal chamber 282 by the cylindrical wall 280.

Figure 11:
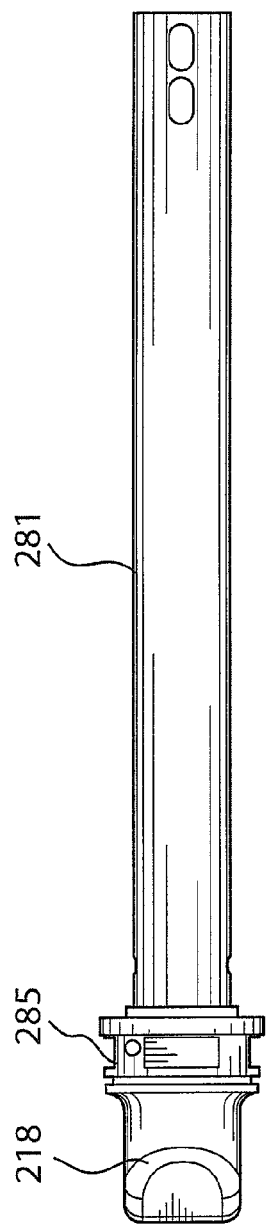
FIG. 11 is a first isolated perspective view of a tubular nut-shaft utilized in the telescoping unit of the fourth embodiment.

In the present embodiment, the cylindrical wall 280 of tubular nut-shaft 281 and the end cap 218 have mating helical threads 283 for interconnecting the parts. As seen best in the isolated view of FIG. 11, to prevent the loosening or unscrewing of the tubular shaft 218 from the end cap 218, a pin (not shown) is installed along a through hole 285 in the end cap 218 that is aligned with the cylindrical wall 280. In this manner the pin does not unduly pierce the cylindrical chamber 286, enabling the full volume of the cylindrical chamber 286 to be used.

A drive nut 258 is rigidly mounted in the cylindrical chamber 286 of the tubular nut-shaft 281 proximate the opening 284 thereof. In the preferred embodiment, the drive nut 258 is riveted into the cylindrical wall 280. The drive nut 258 is coupled with the power screw 240 in order to convert the rotational movement of the power screw 240 into linear motion of the extensible member 216 along a longitudinal axis 288 of the power screw 240.

In the present embodiment, the telescoping unit 204 includes an elongate, stationary, inner guide tube 260, having an open end 262 distal to the power unit 202 and an opposing end 264 proximate to and fixedly connected to the power unit 202, as discussed in greater detail below. The stationary guide tube 260 can be considered to form part of the housing connecting one end of the strut to the liftgate (or vehicle body), with the extensible member 216 connecting the other end of the strut the vehicle body (or liftgate). The stationary inner guide tube 260 is disposed in the toroidal chamber 282 immediately adjacent to the cylindrical wall 280 of tubular nut-shaft 281 and spaced apart inwardly from the cylindrical wall 278 of the outer guide tube/tubular casing 214. The stationary inner guide tube 260 fits closely over the tubular nut-shaft 281 but does not extend or translate linearly with the extensible member 216.

A power spring 268 is seated within the toroidal chamber 282, between the stationary inner guide tube 260 and the cylindrical wall 278 of outer guide tube/tubular casing 214. The power spring 268 is a coil spring that uncoils and recoils as the extensible member 216 moves relative to stationary tube 260 and power unit 202. The annular spacing between the stationary inner guide tube 260 and the outer guide tube/tubular casing 214 is sized to closely fit the preferred toroidal form of power spring 268. One end 289 of the spring 268 is connected to the end cap 218 of the extensible member 216, and another end 290 of the spring is connected to the end 264 of the stationary inner guide tube 260 proximate to, and ultimately supported by, the power unit 202. It should be appreciated that in the present embodiment the power spring 268 is guided and supported against buckling along its entire length of travel by the combined action of the stationary inner guide tube 260, which guides the inside edge of the power spring 268, and the outer guide tube/tubular casing 214, which guides the outer edge of the power spring 268. In the preferred embodiment, when the extensible member 216 is at its fully extended position, the stationary inner guide tube 260 and the outer guide tube/tubular casing 214 overlap or are co-extensive thus inhibiting the tendency of the power spring 268 to buckle.

In the preferred embodiment, the power spring 268 is composed of first and second coil segments 268A, 268B that are serially arranged in the toroidal chamber 282. The first coil segment is wound a first direction, and the second coil segment is wound in the opposite direction. A thrust bearing such as washer 266 is interposed between the first and second coil segments 268A, 268B. This arrangement is advantageous because it balances torsional loads that the coil segments 268A, 268B encounter as the extensible member 216 translates. In contrast, when only one spring is present, as the extensible member moves a torsional force develops at the ends of the spring that will typically cause the spring to rotate, resulting in a high frictional force due to the contact between the many coils in the spring and the outer and inner guide tubes 214, 260. Thus, the preferred embodiment decreases the friction between the power spring 268 and the outer and inner guide tubes 214, 260, increasing the efficiency of the system and reducing manual opening and closing efforts of the liftgate. It should be appreciated, however, that the particular type of spring may vary.

Figure 12:
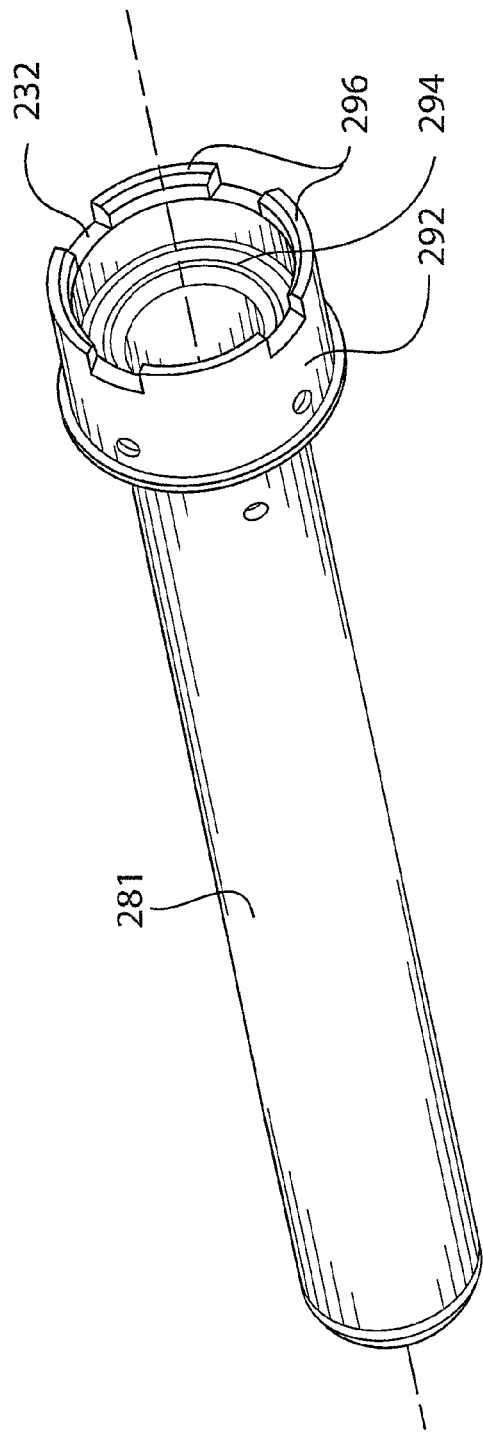
FIG. 12 is a second isolated perspective view of a tubular nut-shaft utilized in the telescoping unit of the fourth embodiment.
Figure 13:
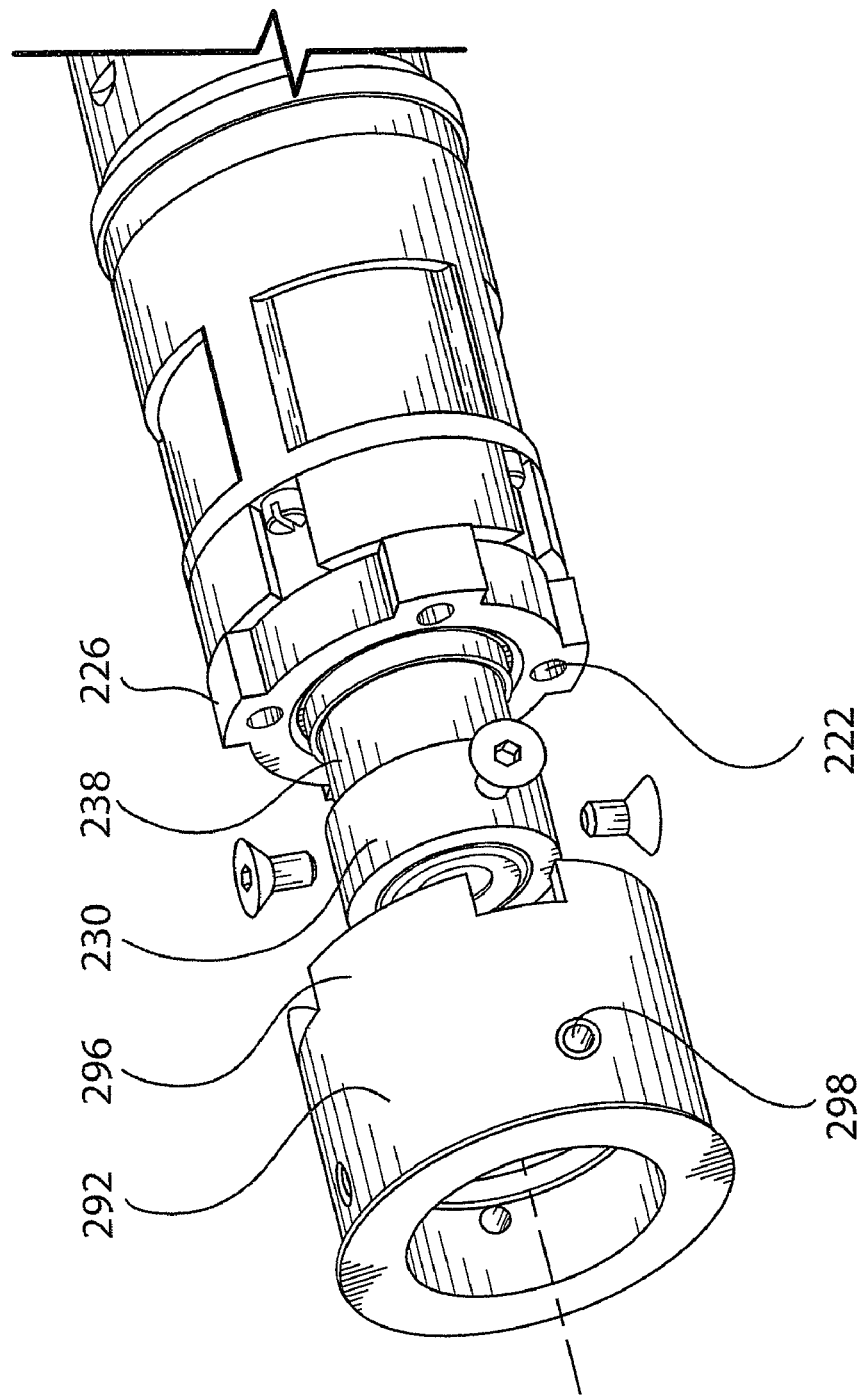
FIG. 13 is a partially exploded fragmentary view of the interface between the telescoping and power units of the fourth embodiment.

The telescoping unit 204 mounts on the power unit as follows: Referring additionally to the fragmentary exploded views of FIGS. 12 and 13, the elastomeric coupling 208 of the power unit 202 is pre-bolted onto its tubular casing 212 via screw holes 222. The elastomeric coupling 208 features a plurality of elastomeric coupling lugs 226.

The stationary inner guide tube 260 includes a tubular bearing housing 292. In the preferred embodiment, for ease of manufacture, the tubular bearing housing 292 is a separate piece that is fixedly mounted is fixedly mounted to the end 264 of tube 260. More particularly, tube 260 (or portions thereof) is flared outwardly, as may be readily accomplished in a crimping or punching operation, to create a circlip 294 against the inner wall of the tubular bearing housing 292. The bearing housing 292 also features a plurality of lugs 296 that interdigitatingly mate with the lugs 226 of the elastomeric coupling 208. In alternative embodiments the stationary guide tube 260 and bearing housing 292 can be formed from one piece.

A tubular gearbox coupler 238 is journalled within the bearing housing 292 via ball bearings 228 (FIG. 8). A spacer sleeve 230 mounted over the gearbox coupler 238 and an internal circlip 232 retain the ball bearings 228 within the housing 292. The gearbox coupler 238 is elongate, with one end of the coupler 238 drivingly mating with the butt end of the power screw 240. Preferably, a pin 256 fixes the spacer sleeve 230 and gearbox coupler 238 to the power screw 240. The other end of the gearbox coupler 238 mates with the power unit output drive shaft 206.

Thus, the telescoping unit 204 may be quickly and easily attached to the power unit 202 by simply slipping the gearbox coupler 238 over the power unit output drive shaft 206 whilst interdigitating the lugs 296, 226 of the bearing housing 292 and the flexible coupling 208. The bearing housing 292 is then preferably fixedly mounted to the tubular casing 212 of the power unit 202 via screw holes 298. It should be appreciated that flexible coupling 208 eliminates the need for very precise alignment of the power screw 240 with the gearbox 246, reducing the need for high precision parts, whilst tolerating a rigid connection between the power screw 240 and gearbox 246.

Figure 10:
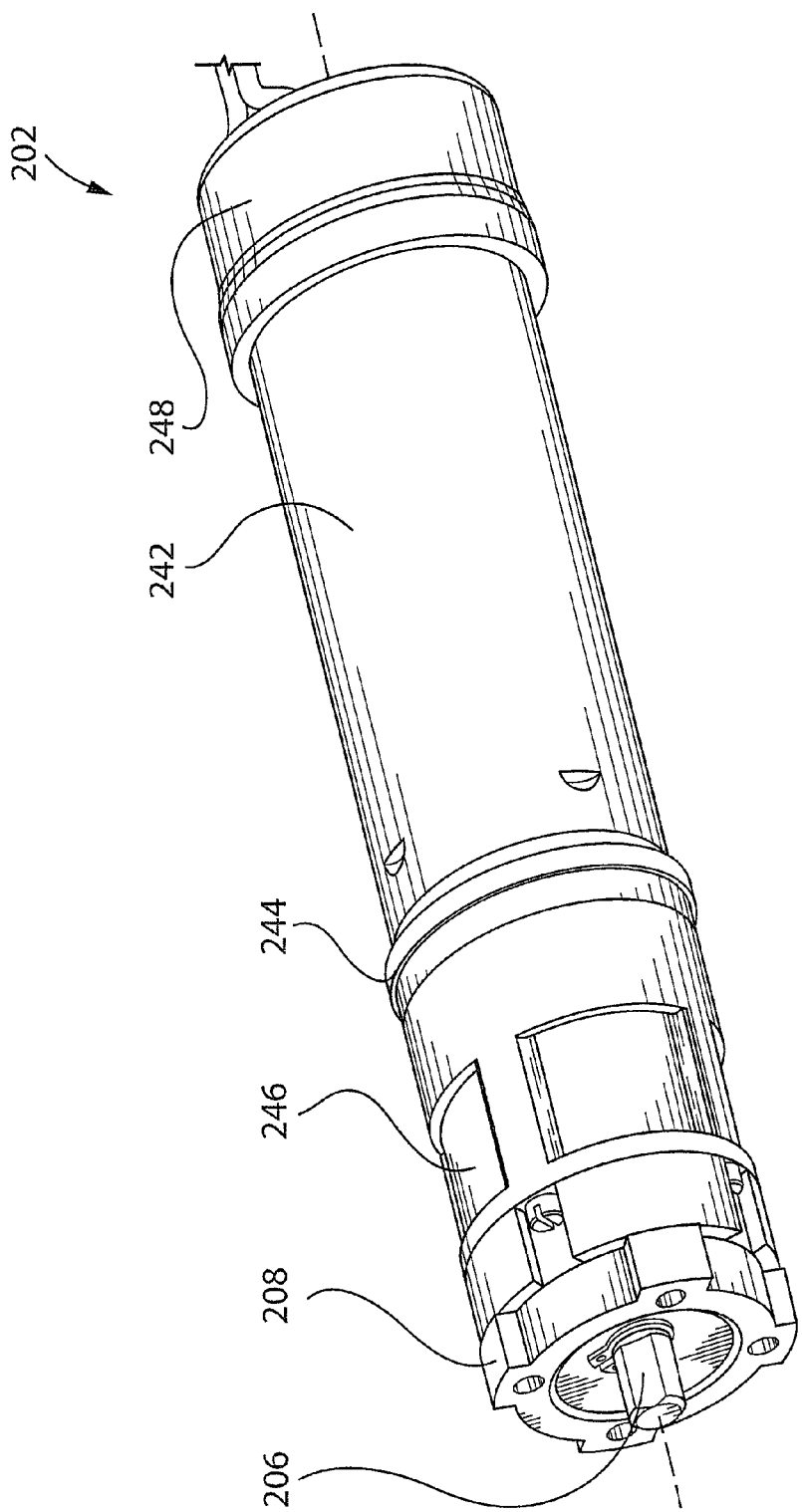
FIG. 10 is a fragmentary perspective view of a power unit of the fourth embodiment, with an outer casing removed from view.

Referring to FIGS. 8 and 10, the power unit 202 includes additional elastomeric spacers or bumpers. More particularly, an elastomeric spacer 244 is installed within casing 212 between the motor 242 and gearbox 246. Another bumper 248 is installed within the casing 212 at the rear end of the motor. The elastomeric bumper 248, spacer 244, and coupler 208 preferably have respective hardnesses of 40, 60 and 80 Durometer Shore A. These elastomeric components isolate the motor 242 and gearbox 246 from the tubular casing 212, dampening the noise and vibration of the system, particularly if the hardness of each elastomeric component is selected to dampen the major harmonic vibrations of the system. In addition, the elastomeric components, particularly the coupling 208, enable the electromechanical strut 200 to have a "soft start" upon power up, which will tend to increase system durability. In particular, absent extra circuitry, when the motor 242 starts up it will tend to have a high starting moment. As the strut 200 is prohibited from rotating due to its connection with the vehicle body and liftgate, this high starting moment will be transferred from the power unit 202 onto the telescoping unit 204. However, the elastomeric coupling 208 will reduce the initial impact on the components and hence reduce the wear and tear on the system. In alternative embodiments, the elastomeric coupling 208 can be mounted to the bearing housing 292 and/or the casing of the power unit 202 may have interdigitating lugs.

In powered operation, torque provided by the motor 242 is transferred via the gearbox 246 to the screw 240, causing linear motion of the extensible member 216 as described above. For manual operation, the motor 242 and the planetary gearbox 246 must be back driven. The friction in the system due to the direct engagement of the motor 242 and the planetary gearbox 246 with the power screw 240 allows the lift gate to remain still in any intermediate position between the open and closed positions. The electromechanical strut 200 thus provides stable intermediate positions for the lift gate (useful, for example, for garages with low ceilings) without power consumption by using the internal friction of the motor-gear assembly 236.

The power spring 268 provides a mechanical counterbalance to the weight of the lift gate. The power spring 268, which preferably comprises two serially arranged coil spring segments, assists in raising the lift gate both in its powered and un-powered modes. When the extensible member 216 is in the retracted position, the power spring 268 is tightly compressed between the end cap 218 of extensible member 216 and the bearing housing 292, which is supported by the tubular casing 212 of the power unit 202. As the power screw 240 rotates to extend the extensible member 216, the power spring 268 extends as well, releasing its stored energy and transmitting an axial force through the extensible member 216 to help raise the lift gate. When the power screw 240 rotates to retract the extensible member 216, or when the lift gate is manually closed, the power spring 268 is compressed between the end cap 218 and the bearing housing 292 and thus recharges.

It is appreciated that a ball screw assembly, as known in the art, could be used in lieu of the drive nut 258. Also, although reference has been made specifically to a lift gate, it is also appreciated that the invention may be applied to a variety of other closure panels such as trunks or deck lids.

The above-described embodiments of the invention are intended to be examples of the present invention and alterations and modifications may be effected thereto, by those of skill in the art, without departing from the spirit of the invention.

What is claimed:

1. An electromechanical strut for moving a pivotal lift gate between an open position and a closed position relative to a motor vehicle body, the electromechanical strut comprising:
   a housing connected to one of the lift gate and the motor vehicle body, the housing including a stationary guide tube;
   an extensible member slidably mounted to the housing and connected to the other of the lift gate and the motor vehicle body, the extensible member including spaced apart outer and inner tubular walls defining a toroidal chamber therebetween and a radially inner interior chamber, the stationary guide tube extending into the toroidal chamber adjacent the inner tubular wall of the extensible member;
   at least one coil spring disposed within the toroidal chamber and coupled between one end of the extensible member and the housing for providing a mechanical counterbalance to the weight of the lift gate, wherein a radially inner edge of the at least one coil spring is guided by the stationary guide tube and a radially outer edge of the at least one coil spring is guided by the outer tubular wall of the extensible member;
   a motor-gear assembly mounted in the housing;
   a rotatable power screw connected to and driven by the motor gear assembly, the power screw extending into the radially interior chamber of the extensible member; and
   a drive nut fixedly mounted in the interior chamber of the extensible member, the drive nut threadingly engaging the power screw;
   whereby the motor gear assembly converts rotary motion of the power screw into linear motion of the extensible member to move the extensible member between a retracted position corresponding to the closed position of the lift gate and an extended position corresponding to the open position of the lift gate.

2. An electromechanical strut for moving a pivotal lift gate between an open position and a closed position relative to a motor vehicle body, the electromechanical strut comprising:
   a power unit, the power unit including a casing and a motor-gear assembly mounted within the casing, the motor-gear assembly including an output drive shaft; and
   a telescoping unit, the telescoping unit including a stationary guide tube and an extensible member slidably mounted to the stationary guide tube; the stationary member including a rotatable power screw journalled therein; the extensible member including spaced apart outer and inner tubular walls defining a toroidal chamber therebetween and a radially inner interior chamber, the stationary guide tube extending into the toroidal chamber adjacent the inner tubular wall of the extensible member; the toroidal chamber receiving at least one coil spring connected between one end of the extensible member and one end of the stationary tube, wherein a radially inner edge of the at least one coil spring is guided by the stationary guide tube and a radially outer edge of the at least one coil spring is guided by the outer tubular wall of the extensible member; and the radially inner interior chamber having a drive nut fixedly mounted therein, the drive nut threadingly engaging the power screw;
   wherein the telescopic unit is attached to the power unit such that the output drive shaft drivingly engages the power screw.

3. An electromechanical strut as set forth in claim 2 including an elastomeric coupling mounted between power unit and the telescoping unit for reducing impact of the motor-gear assembly on the telescoping unit.

4. An electromechanical strut as set forth in claim 3 wherein the elastomeric coupling features a plurality of lugs and is mounted to one of the stationary guide tube and the power unit casing, and at least one of the stationary guide tube and the power unit casing features lugs interdigitating with the coupling lugs.

5. An electromechanical strut as set forth in claim 2, further including at least one elastomeric spacer mounted between the motor gear assembly and the power unit casing.

6. An electromechanical strut as set forth in claim 2, including a gearbox coupler mounted to power screw for readily interconnecting the power screw with the power unit output shaft.

7. An electromechanical strut as set forth in claim 2, wherein two serially arranged coils segments with a thrust bearing therebetween are mounted in the toriodal chamber, one coil spring being wound in a first direction, the other coil spring being wound in the other direction.

8. An electromechanical strut for moving a pivotal lift gate between an open position and a closed position relative to a motor vehicle body, the electromechanical strut comprising:
   a power unit, the power unit including a casing and a motor-gear assembly mounted within the casing, the motor-gear assembly including an output drive shaft; and
   a telescoping unit, the telescoping unit including a stationary tube and an extensible member slidably mounted to the stationary tube; the stationary tube including a rotatable power screw journalled therein; the telescoping unit including at least one coil spring connected between one end of the extensible member and one end of the stationary tube, the extensible member having a drive nut threadingly engaging the power screw;

wherein the telescopic unit is attached to the power unit such that the output drive shaft drivingly engages the power screw; and an elastomeric coupling mounted between power unit and the telescoping unit for reducing impact of the motor-gear assembly on the telescoping unit; wherein the elastomeric coupling features a plurality of lugs and is mounted to one of the stationary guide tube and the power unit casing, and at least one of the stationary guide tube and the power unit casing features lugs interdigitating with the coupling lugs.

9. An electromechanical strut as set forth in claim 8, including a gearbox coupler mounted to the power screw for readily interconnecting the power screw with the power unit output shaft.

10. An electromechanical strut as set forth in claim 8, wherein two serially arranged coil segments with a thrust bearing therebetween are mounted in the extensible member, one coil spring being wound in a first direction, the other coil spring being wound in the other direction.

* * * * *